US006173074B1

US 6,173,074 B1
(12) United States Patent
Russo (10) Patent No.: US 6,173,074 B1
(45) Date of Patent: *Jan. 9, 2001

(54) ACOUSTIC SIGNATURE RECOGNITION AND IDENTIFICATION

(75) Inventor: Anthony Peter Russo, Upper Montclair, NJ (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/940,321

(22) Filed: Sep. 30, 1997

(51) Int. Cl.[7] ............................. G06K 9/46; G06K 9/66
(52) U.S. Cl. ..................... 382/190; 382/100; 367/140; 367/135
(58) Field of Search ................................. 382/190, 194, 382/209, 100, 191, 210; 367/135, 140, 21–23, 68, 70–73, 118, 136; 73/579, 602, 649, 658, 659; 600/443

(56) References Cited

U.S. PATENT DOCUMENTS

| 3,069,654 | 12/1962 | Hough | 382/281 |
|---|---|---|---|
| 5,355,208 | 10/1994 | Crawford et al. | 356/345 |
| 5,430,690 | * 7/1995 | Abel | 367/135 |
| 5,879,303 | * 3/1999 | Averkiou et al. | 600/447 |

OTHER PUBLICATIONS

Ballard, D.H. and Brown, C.M., *Computer Vision*, p. 151, Prentice–Hall, 1982.
Russo, A.P., "Constrained Neural Networks for Recognition of Passive Sonar Signals Using Shape," IEEE Conference on Neural Networks in Ocean Engineering, Washinton, DC, pp. 69–76, Aug., 1991.

* cited by examiner

Primary Examiner—Bhavesh Mehta
(74) Attorney, Agent, or Firm—Gibbons, Del Deo, Dolan, Griffinger & Vecchione (57) ABSTRACT

An acoustic signature recognition and identification system receives signals from a sensor placed on a designated piece of equipment. The acoustic data is digitized and processed, via a Fast Fourier Transform routine, to create a spectrogram image of frequency versus time. The spectrogram image is then normalized to permit acoustic pattern recognition regardless of the surrounding environment or magnitude of the acoustic signal. A feature extractor then detects, tracks and characterizes the lines which form the spectrogram. Specifically, the lines are detected via a KY process that is applied to each pixel in the line. A blob coloring process then groups spatially connected pixels into a single signal object. The harmonic content of the lines is then determined and compared with stored templates of known acoustic signatures to ascertain the type of machinery. An alert is then generated in response to the recognized and identified machinery.

19 Claims, 5 Drawing Sheets

ACOUSTIC SIGNATURE RECOGNITION AND IDENTIFICATION

FIELD OF THE INVENTION

This invention relates to acoustic signal analysis and in particular, to an acoustic signature recognition and identification system which alerts a user of machinery in proximity to a sensor placement.

BACKGROUND OF THE INVENTION

The measurement and analysis of vibrational and/or acoustic data is a widely used technique for determining the type or operating state of a machine. It is generally known that each type of machinery generates a plurality of frequencies dependent upon the operating condition of the machinery. For example, whether the machinery is idling, revving up or revving down changes the frequencies generated by the machinery. The changes in the frequency result from the interaction of the forces required to transition from one machine state to another. Importantly, these frequency shifts reflect changes in the characteristics of the machinery. The complex composite wave formed is unique for each type of machinery and is utilized for identification and recognition.

As illustrated in the prior art, the analysis of the acoustic data can be implemented in the time or frequency domain. In the frequency domain, the frequency spectrum of the machinery is termed an acoustic signature. By comparing the acoustic signature of the unknown or test machinery against a databank of collected acoustic signatures, it is possible to determine the state and/or type of machinery. In certain applications, it is important to determine both the type and state of the machinery. For example, in the telecommunications field thousands of telephone calls are carried over fiber optical cables which are buried underground. The owners can mitigate the consequences of any damage imposed by the machinery on the fiber optic cables by identifying the type and state of any machinery located near the fiber optic cables.

A drawback of the prior art devices is that they require human interaction to render a decision. Accordingly, there is a need to provide an acoustic signature identification and recognition system that alerts the owner by analyzing sound vibrations that impinge upon their equipment and by identifying the encroaching machinery.

SUMMARY OF THE INVENTION

The present invention teaches a system and method which utilizes the acoustic signatures of different types of machinery and their associated operating states, to provide alerts in response to specific conditions. This system utilizes minimal human intervention in rendering a decision. Importantly, it is adaptable to and applicable for numerous types of activities and interests, e.g., telecommunications cables and gas pipelines.

In an exemplary embodiment of the present method, acoustic signals received from an interferometer are converted to a digital format and are processed to create a spectrogram image of frequency versus time. The spectrogram image is then normalized to permit recognition of the acoustic pattern regardless of the magnitude of the acoustic signal. A feature extractor then detects, tracks and characterizes the lines which form the spectrogram. Specifically, the lines are detected via a KY process that is applied to each pixel in the line. A blob coloring process then groups spatially connected pixels into a single signal object. The harmonic content of the lines is then determined and compared with stored templates of known acoustic signatures for recognition and identification purposes.

Advantageously, the system and method of the present invention can be utilized to alert a party if any type of machinery is within the vicinity of, for example, a remotely located underground gas line, fiber optic cables for telephones or television or sewer lines. The above factors make the present invention a versatile system and method for machine recognition and identification.

BRIEF DESCRIPTION OF THE DRAWINGS

A more complete understanding of the present invention may be obtained from consideration of the following description in conjunction with the drawings in which:

FIGS. 3(*a*), 3(*b*) and 3(*c*) illustrate a normalization process in accordance with the method of the present invention;

FIGS. 5(*a*) and 5(*b*) are illustrations of signal extension in the a and y directions, respectively, in accordance with the method of the present invention.

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 1–2 may be provided by a single shared processor. (Use of the term "processor" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

The present invention is a system for analyzing acoustic data generated from various types of machinery. The system and method are applicable to numerous types of activities and interests, e.g., detection of submarines, counting the number of cars passing a specific point and detection of underground structures. For example, as described below, the system is implementable as a sensor for detecting the presence of potentially harmful machinery near underground fiber optic cables or gas pipelines. Specifically, the system could analyze the acoustic information that may be impinging upon the fiber optic cable, identify the source and generate an alert.

In general, the acoustic signals are received from an interferometer which is located on the equipment to be protected. The acoustic data is then transmitted and converted to a digital format. The digital data is then processed, via a Fast Fourier Transform routine, to create a spectrogram image of frequency versus time. The spectrogram image is then normalized to permit acoustic pattern recognition regardless of the surrounding environment or magnitude of the acoustic signal. A feature extractor then detects, tracks and characterizes the lines which form the spectrogram. Specifically, the lines are detected via a KY process that is applied to each pixel in the line. A blob coloring process then groups spatially connected pixels into a single signal object. The harmonic content of the lines is then determined and compared with stored templates of known acoustic signatures to ascertain the type of machinery. An alert is then generated in response to the recognized and identified machinery.

Figure 1:
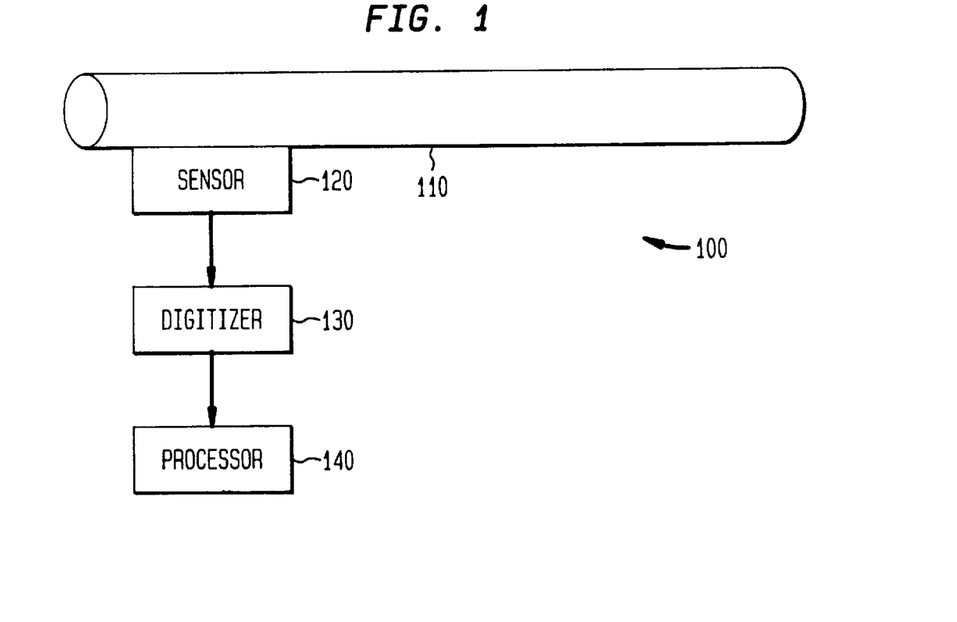
FIG. 1 is an exemplary embodiment of an acoustic signature recognition and identification system in accordance with the present invention.

FIG. 1 illustrates an exemplary embodiment of a system 100 which utilizes the present invention. System 100 consists of a fiber optic cable 110, which permits the transmission of multiple telephone calls or television signals between users and/or central stations. Fiber optic cable 110 may be buried underground. A sensor 120 is coupled to fiber optic cable 110 for receiving the acoustic signals or sound vibrations present along fiber optic cable 110 or the surrounding environment. Sensor 120 is nominally connected to one end of fiber optic cable 110. In an exemplary embodiment, sensor 120 is an optical interferometer device, which essentially turns the entire fiber optic cable into one long microphone. Sensor 120 is linked to a processor 140 through a digitizer 130. The link to the digitizer is implementable via a wired or wireless link. Digitizer 130 converts the acoustic data to a digital format acceptable by processor 140, which implements the functionality or method of the present invention.

Figure 2:
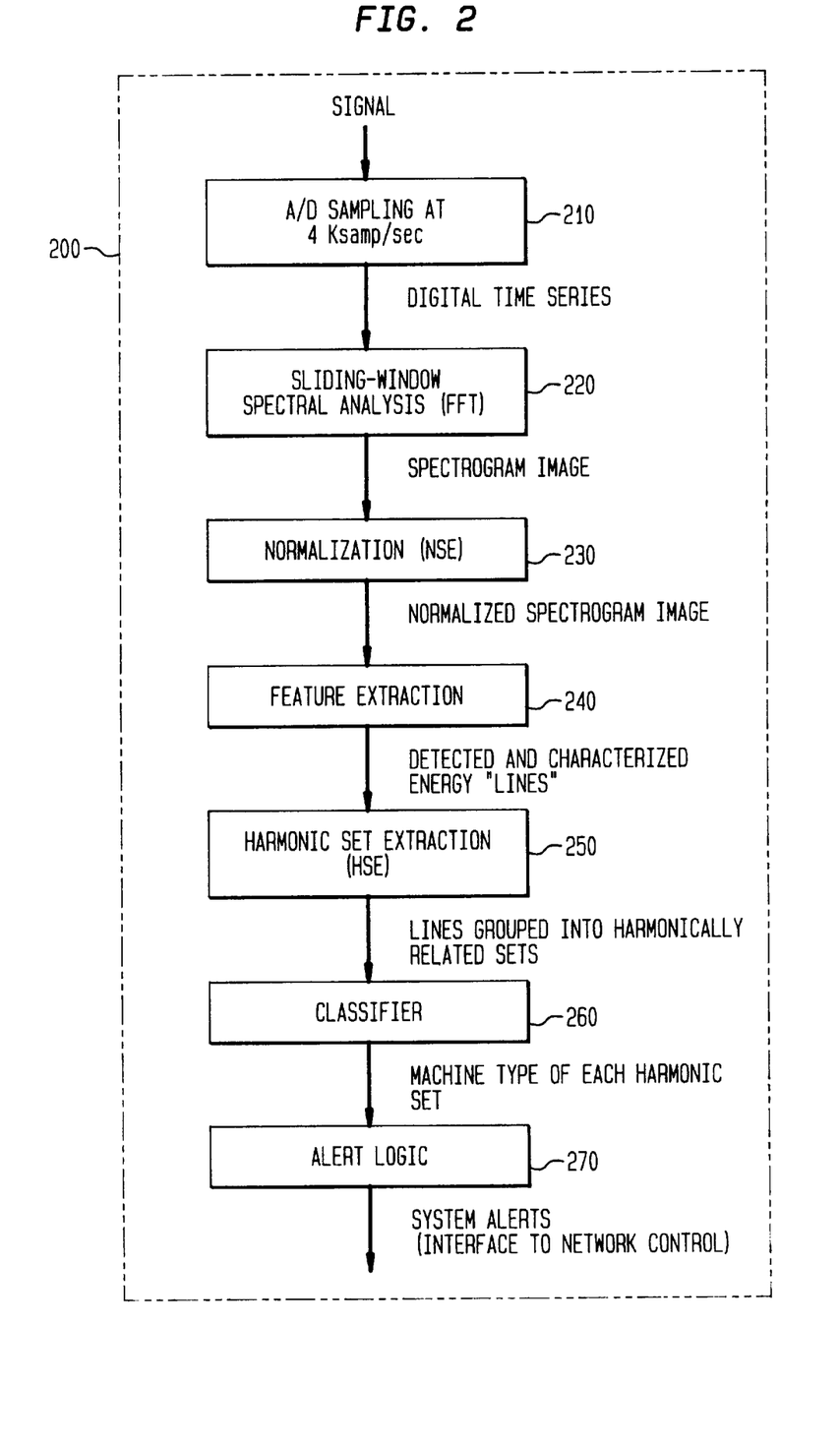
FIG. 2 is a functional flowchart of an acoustic signature recognition and identification in accordance with the method of the present invention.

Referring now to FIG. 2, an exemplary functional flowchart 200 is presented of an acoustic signature recognition and identification method, which is employable in system 100 of FIG. 1. The following discussion focuses on the automatic detection of machinery operating in close proximity to a fiber optic cable and determining if the cable is in danger of being severed. However, the system and method have other applications, for example, underground gas pipelines, underwater detection and transportation activity.

Data or acoustic signals from sensor 120 arrive in real time. System 100 processes the data in small time periods called "processing cycles." For each processing cycle, system 100 outputs an alert, if applicable. In an exemplary embodiment, the processing cycle is 1–2 seconds. The first step in the processing is to digitize the acoustic signals coming from sensor 120 (step 210). Preferably, an analog-to-digital converter is utilized which samples the data at a rate of 4,000 samples/sec with a standard data acquisition card. Higher and faster sampling rates are used if the computational processing power is available.

Figure 6:
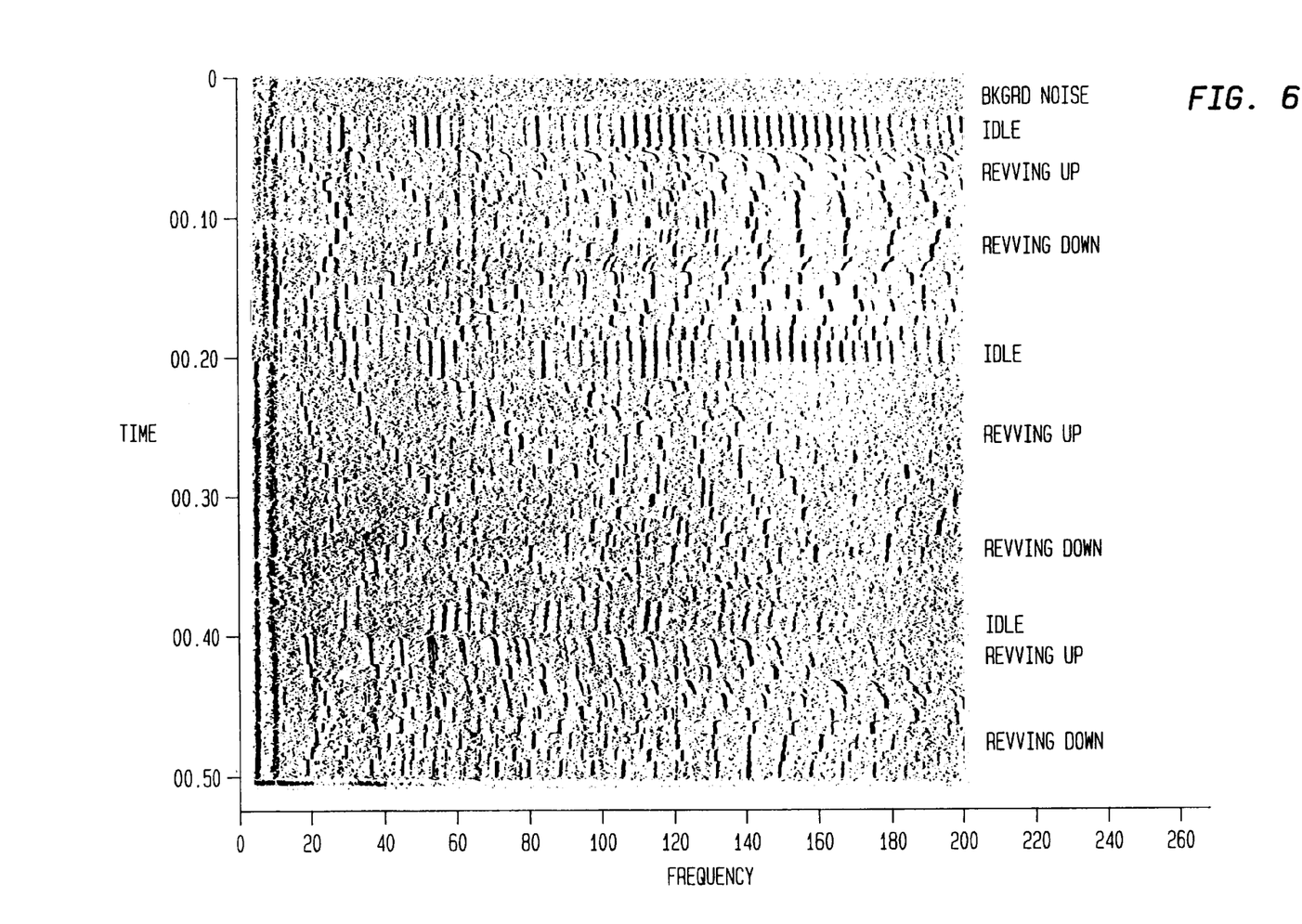
FIG. 6 illustrates the lines which are present with respect to various machine conditions.

After digitization, a sliding-window Fast Fourier Transform spectral analysis is performed on the data to create a spectrogram image of frequency versus time (step 220). The spectrogram image characterizes the acoustic signal in the frequency domain as a function of time. As shown in FIG. 6, the gray levels present in the image are proportional to the amount of energy present at a given frequency (x axis) and time point (y axis). A single row of the spectrogram image is called a "scan." Each scan consists of a row of pixels. A processing cycle may consist of one or more scans, which is configurable/selectable at run time. The system processes one scan at a time and links the results to results found from previous lines, where a line is a specialized grouping of the pixels in accordance with the method of the present invention. After a period of time or multiple processing cycles, enough of the image is obtained to make a determination of harmonic content. The frequency and time resolution characteristics of the spectrogram image are approximately 1 Hz and 2 seconds. Again, the above are exemplary values and better resolution in frequency and time is acceptable if processing power is available.

Normalization ("NSE") is then applied to the spectrogram image so that downstream processing parameters can be set independent of sensor gain, and also to enhance the detectability of narrow lines on the spectrogram image (step 230). For each pixel in the image, the NSE flattens the noise background by estimating the noise at each pixel. This is accomplished for each pixel in the original spectrogram by calculating an estimate of the noise in the neighborhood of that pixel. The original pixel amplitude value is then divided by our estimate of the noise for that pixel, and the output is the new ("NSE-ed") pixel. That is, each pixel's normalized value is the original pixel's value divided by the noise estimate at that pixel.

Figure 3A:
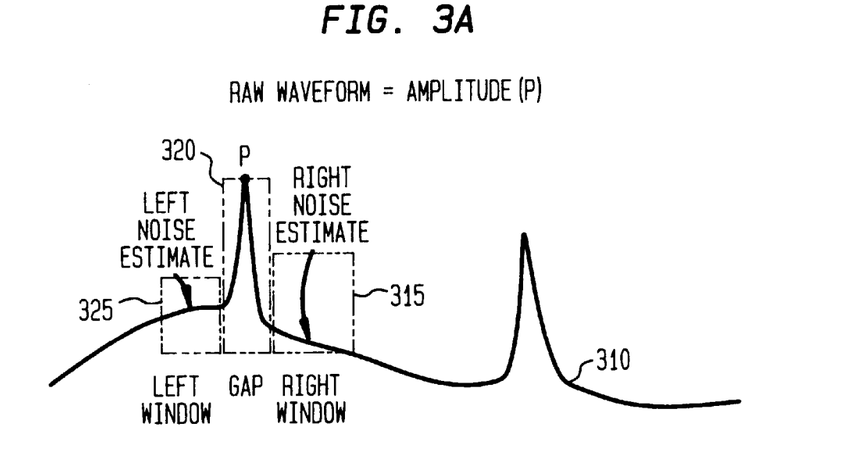
Figure 3B:
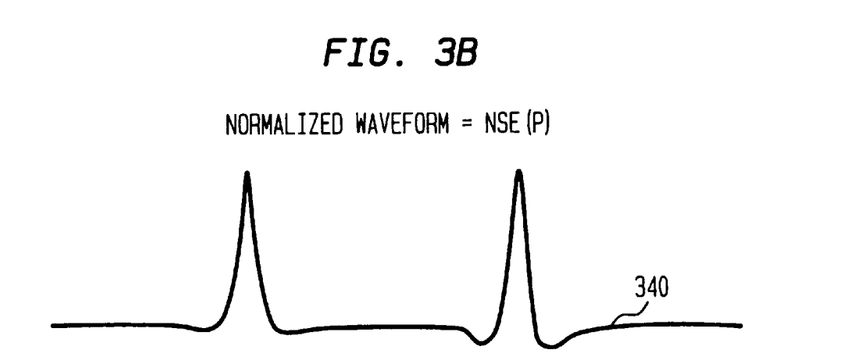
Figure 3C:
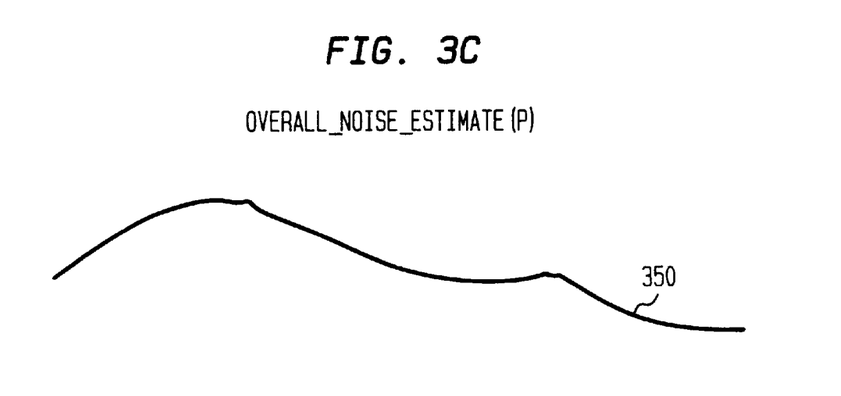

FIGS. 3(a), 3(b) and 3(c) illustrate how NSE operates on a single scan of the spectrogram. At each pixel, the NSE averages the data in windows to the left and right of that pixel. The window can be of any length, for example, 50 pixels is a good size. The average of the data contained in the windows is the noise estimate. The NSE is used to flatten the noise spectrum of signals by converting the signal amplitude waveform to a signal-to-noise waveform. Each waveform usually corresponds to one scan of the spectrogram image. Referring to FIG. 3(a), at each point P on waveform 310, a set of boxes is centered to create a right box 315, a center box 320 and a left box 325. As stated above, the length of the boxes is variable. As illustrated, left box 325 is used to estimate the baselevel noise to the left of the signal in the middle box and right box 315 is used to estimate the baselevel noise to the right of the signal. The noise estimates can be based on a variety of statistics, for example, mean or median. An overall noise estimate 350 is calculated by combining the left and right noise estimates and is illustrated in FIG. 3(c). A normalized waveform 340, as shown in FIG. 3(b), is obtained by dividing the amplitude by the overall noise estimate:

$$NSE(P) = amplitude(P)/overall\_noise\_estimate(P)$$

After normalizing the data, machine recognition requires that a feature extractor be applied to the data (step 240). For recognizing machinery, narrowband energy must be detected, characterized, and tracked in time. The present invention feature extractor operates on gray-level images, for instance, spectrograms. Specifically, the feature extractor detects, characterizes and tracks lines, where the lines may be straight or very wiggly. It is applicable for various signal processing, image analysis and pattern recognition problems.

As shown in FIG. 6, a gray-level image of interest consists of many dark lines which are trivial for humans to track but can be difficult for machines to follow automatically. To assist in the automatic detection, characterization and tracking, the feature extractor performs pixel detection, signal line formation and tracking, and signal description and characterization on each line.

Figure 4:
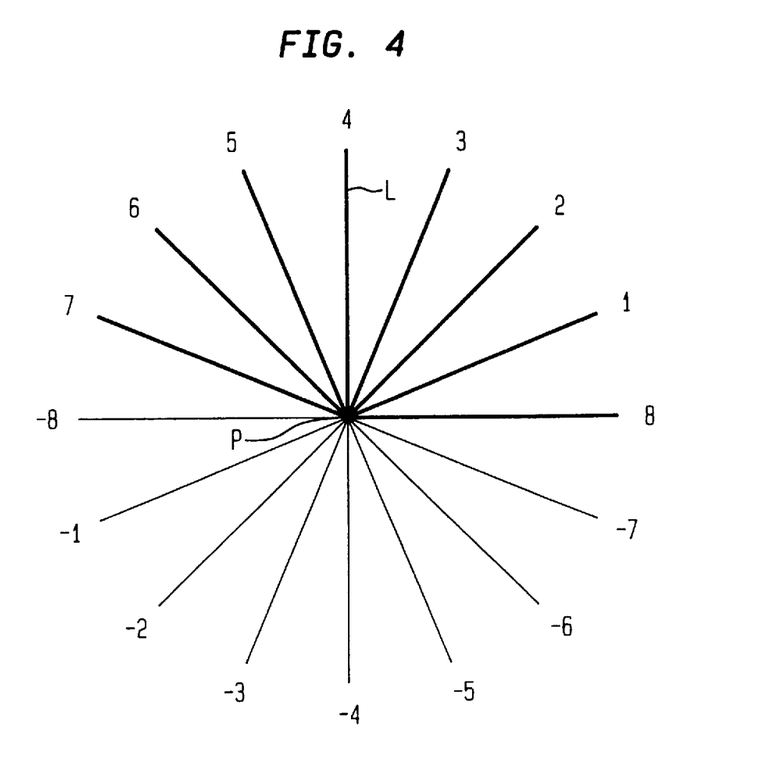
FIG. 4 is an exemplary embodiment of line segments utilized to calculate the KY value of a pixel in accordance with the method of the present system.

Lines are detected using the KY algorithm. First, each pixel in the image is labeled as "ON" if and only if 1) the gray-level value of the pixel is above a fixed threshold, and 2) the "KY value" of the pixel is above another fixed threshold. Otherwise, the pixel is marked "OFF" and considered not-detected for the time being. The KY value is the maximum value of the set of sums of pixels along each of the eight upper and eight lower mathematical lines depicted in FIG. 4. That is, all of the pixel values along each of the upper lines are added together and the largest value is selected. This is then repeated for the lower eight lines. The total KY value is the sum of the two maximum values. In the equations stated below, the term $Q_L$ refers to all of the pixels through which one of the sixteen lines lie. The term $S_L$ represents the sum of all the pixels in $Q_L$. That is, $S_L$ is the sum along a single line. Specifically, the KY value of a pixel p is calculated as shown in FIG. 4. In that illustration, there 8 boldface line segments (1 to 8) and 8 other line segments (−1 to −8), all of length k and all centered at pixel p. Each line segment L intersects a set of pixels $Q_L$ and each pixel $p_{ij}$ in the image has a gray-level value of $G(p_{ij})$. If $$S_L = \sum_{all\ pixels\ p_{ij}\ in\ Q_L} G(p_{ij})$$

Then we define the KY value of pixel p as:

$$KY(p) = \max_{1 \leq L \leq 8} (S_L) + \max_{1 \leq L \leq 8} (S_{-L})$$

Signal formation and tracking of the pixels is performed after each pixel in the image is marked as ON or Off. The ON pixels are formed into tracked signals by a "blob-coloring" algorithm that takes all spatially connected pixels and groups them into a single signal object and as described in D. H. Ballard and C. M. Brown, Computer Vision, p. 151, Prentice-Hall, 1982, herein incorporated by reference. The tracking is then done by connectivity only. In a preferred embodiment, the feature extractor handles cases where separate objects split into two objects even though all the pixels in it are spatially connected.

Figure 5A:
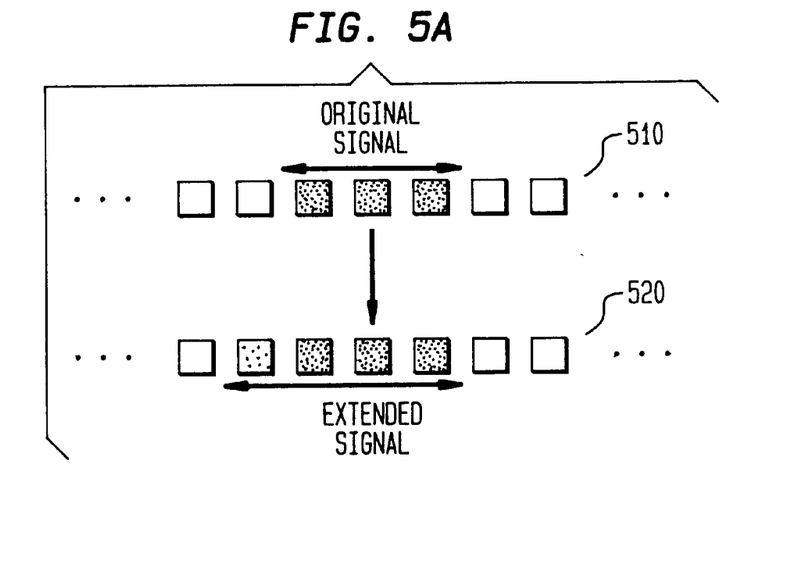
Figure 5B:
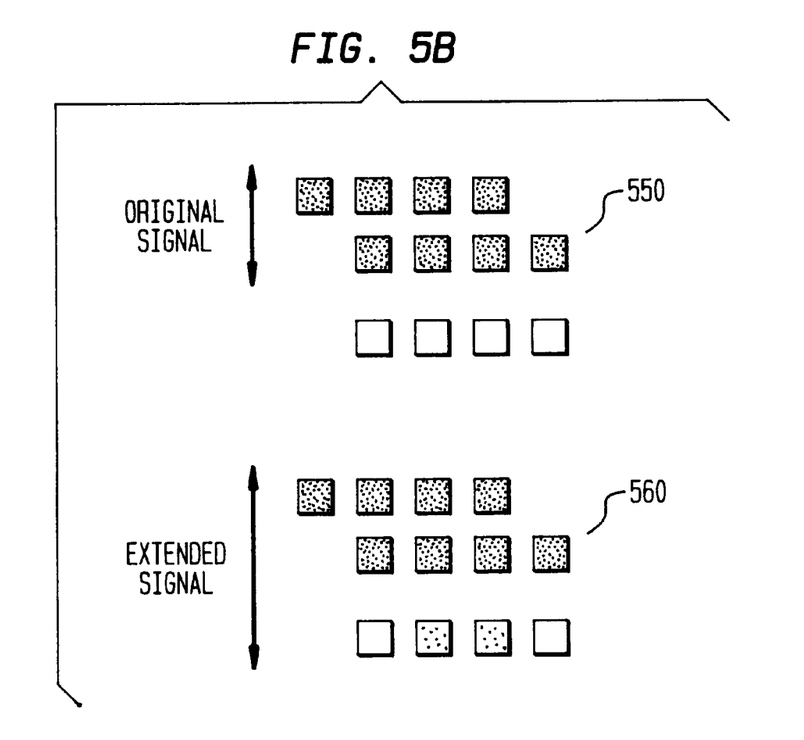

In an exemplary embodiment of the feature embodiment, the feature extractor ensures good connectivity by implementing processing which turns some OFF pixels into ON pixels. Specifically, there are two cases which are depicted in FIGS. 5(a) and 5(b). For case 1, the additional processing widens an already formed signal 510 along the x-direction to form an x extended signal 520. Each scan of the object is widened up to N pixels left and right if, for each OFF pixel p bordering the left or right edge of the signal, KY (p) is greater than a fixed threshold. For case 2, the additional processing extends an already formed signal 550 along the y-direction to form a y extended signal 560. Each OFF pixel p bordering the bottom edge of the signal is turned ON and becomes a part of the signal if KY (p) is greater than a fixed threshold.

Once the pixel or line detection and signal formation and tracking processing is completed, the signal is characterized with the following attributes: average gray-level amplitude, signal-to-noise ratio, signal bandwidth, frequency, a complete set of pixels in the signal and track shape. The algorithms for amplitude, signal-to-noise and bandwidth are well-known terms in the art of signal processing. They are straightforward measurements and the implementation technique is not critical. The "set of pixels" is a result of the blob-coloring algorithm. For track shape, there are multiple techniques, for example, the neural network method described in A. P. Russo, "Constrained Neural Networks for Recognition of Passive Sonar Signals Using Shape," Proceedings of the IEEE Conference on Neural Networks in Ocean Engineering, Washington, D.C., p. 69–76, August. 1991, and the Hough Transform mentioned in the Ballard and Brown book noted above, both of which are herein incorporated by reference.

Once the lines have been characterized by the feature extractor, they are processed by a harmonic set extractor ("HSE"), which groups harmonically related sets (step 250). Most digging machinery emits energy that is harmonically related with a fundamental frequency associated with the engine's revolutions per minute ("RPM"). Therefore, it is important to automatically determine which lines output by the feature extractor have harmonic relationships.

For each pair of lines output by the feature extractor, the HSE calculates a fundamental frequency. That is, if the lines output have frequencies $f_1$ and $f_2$, then the fundamental frequency is the absolute difference between the $f_1$ and $f_2$: fundfreq=absolute_value $(f_1-f_2)$. A counter corresponding to the fundamental frequency is then incremented. After all of the pairs of lines have been checked, examine the counter to see if any of the counts for any of the fundamental frequencies is above a threshold. If it is, the HSE has detected a harmonic set for that fundamental frequency. If more than one counter is above the threshold, then multiple harmonic sets have been detected. By storing the list of lines that contribute to a histogram for each fundamental frequency, the lines which are harmonically related can be grouped. The HSE output is a list of all the harmonically-related groups, each one characterized by the fundamental frequency of each group. The following is a simple example to illustrate the above processing. As stated, the feature extractor outputs the frequency of each line it finds to the harmonic set extractor. Suppose the feature extractor finds three lines at frequencies $f_1=5$, $f_2=10$ and $f_3=15$. Then the HSE determines that the three frequencies form a harmonically related set of lines, all of which have frequencies that are multiples of some fundamental frequency $f_0$. In this example, these lines are all multiples of 5 Hz. They are also integer multiples of 2.5 Hz. The HSE then selects one based on a given criteria. For example, it could select 5 Hz if the criteria required that the fundamental frequency should be an integer.

Once the HSE groups the harmonically related sets, the lines then have to classified by comparing it to stored templates of known machinery (step 260). The stored templates for each known machine type contain the following information: minimum number of harmonics ("$h_{min}$") maximum number of harmonic ("$h_{max}$"), list of all typically seen harmonic numbers ("predominance pattern"), lowest possible fundamental frequency ("$f_{low}$"), highest possible fundamental frequency ("$f_{high}$"), and typical fundamental ("$f_{typ}$").

For each group of lines, the comparison processor determines how closely that group resembles each of the stored templates by calculating a score. If the template with the highest score exceeds a threshold, the group is classified as the machine corresponding to the template. The score is calculated as follows:

1) If the group has fewer than the minimum number of lines specified in the template, the score is zero.
2) If the group has more than the maximum number of lines specified in the template, the score is zero.
3) If the group has a fundamental frequency that is not within the range of acceptable fundamentals, the score is zero.
4) If all of the above items were false, and if there is a line in the group corresponding to one of the typically seen harmonic numbers in the template, then a variable, termed for instance "LINESCORE", is incremented by one. A perfect score at this point would then be equal to $h_{max}$, the maximum number of harmonics.

The final score is then calculated by:

$$\text{score} = \text{weight} * (\text{LINESCORE}/h_{max}) + ((1-\text{weight}) \cdot \text{abs\_value}(\text{fund\_feq} - \text{ftyp}))$$

where weight is less than 1.0 (typically equal to 0.7) and "flud_freq" is the fundamental frequency of the harmonic group being classified. Once the class of the group is known, other information can be used to determine what mode the machine may be operating in. The best indication is given by the fundamental frequency, which is related to the engine's RPM. Other factor's include how the lines in the group vary in frequency over time, which can be automatically categorized as described in the Neural Net reference disclosed above.

Once the type and characteristics of the machine have been classified, it is forwarded to an alert logic (step 270), which serves as the interface to a network controller or human operator. The alert logic determines based on the classified groups whether, for example, a digging machine is persistently present that poses a threat to a fiber optic cable. Information regarding the type of machine, what mode it may be operating in, e.g., idle, digging, and how long it's been in the vicinity, is made available.

An acoustic signature recognition and identification system is described herein. Acoustic signals from a sensor are transmitted to a pre-processor which generates a spectrogram image of the acoustic signals. A feature extractor then detects, tracks and characterizes the lines from the spectrogram image. A post-processor then determines the harmonic content of the lines, compares the content against known acoustic signatures and generates an alert.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A system for recognizing and identifying acoustic signals from a sensor, comprising:
    a pre-processor for generating a gray-level image of the acoustic signals;
    a feature extractor for detecting, tracking and characterizing at least one line of the gray-level image, said feature extractor calculating a fundamental frequency for each of said at least one line and grouping said at least one line into harmonically related lines based on said fundamental frequency; and
    a post-processor for determining a harmonic content of said at least one line and comparing said harmonic content against known acoustic signatures by calculating a weighted score based on said fundamental frequency.

2. The system according to claim 1, wherein said feature extractor includes a line detector for labeling a pixel with a first state and a second state, said first state and said second state being mutually exclusive, wherein said pixel is labeled with said first state if a grey-level value of said pixel is above a first threshold and a KY value of said pixel is above a second threshold.

3. A system for recognizing and identifying acoustic signals from a sensor, comprising:
    a pre-Processor for generating a gray-level image of the acoustic signals;
    a feature extractor for detecting, tracking and characterizing at least one line of the gray-level image, said feature extractor calculating a fundamental frequency for each of said at least one line and grouping said at least one line into harmonically related lines based on said fundamental frequency; and
    a post-processor for determining a harmonic content of said at least one line and comparing said harmonic content against known acoustic signatures
    wherein said feature extractor includes a line detector for labeling a pixel with a first state and a second state, said first state and said second state being mutually exclusive, wherein said pixel is labeled with said first state if a grey-level value of said pixel is above a first threshold and a KY value of said pixel is above a second threshold; and
    wherein said pixel has an upper set of line segments and a lower set of line segments extending radial from said pixel, said line detector further including:
        a first summer for summing grey-level values of all pixels along each of said upper set of line segments and said lower set of line segments, said first summer determining a upper line segment maximum value and a lower line segment maximum value; and
        a second summer for summing said upper line segment maximum value and said lower line segment maximum value to determine said KY value.

4. The system according to claim 2, wherein said feature extractor includes a blob-coloring processor for forming into tracked signals all pixels having said first state by taking all spatially connected pixels and grouping them into a single signal object.

5. The system according to claim 2, wherein said feature extractor further includes a signal extender for extending a signal in a given direction by labeling pixels with said second state with said first state when said pixels have a KY value greater than a third threshold.

6. The system according to claim 1, wherein said post-processor includes a classifier for computing a classification score for each group of lines output by a harmonic set extractor by comparing said each group of lines against at least one acoustic signature template.

7. An apparatus for recognizing and identifying acoustic signals from a sensor, comprising:
    a spectrum analyzer for generating a spectrogram image of the acoustic signals;
    a feature extractor for detecting, tracking and characterizing at least one line of said spectrogram image, said feature extractor calculating a fundamental frequency for each of said at least one line and grouping said at least one line into harmonically related lines based on said fundamental frequency;
    a harmonic set extractor for determining a harmonic content of said at least one line; and
    a classifier for comparing said harmonic content against known acoustic signature templates by calculating a weighted score based on said fundamental frequency.

8. The apparatus according to claim 7, wherein said feature extractor includes a detector for labeling a pixel with a ON state and a OFF state, wherein said pixel is labeled with said ON state if a grey-level value of said pixel is above a first threshold and a KY value of said pixel is above a second threshold.

9. An apparatus for recognizing and identifying acoustic signals from a sensor, comprising:
a spectrum analyzer for generating a spectrogram image of the acoustic signals;
a feature extractor for detecting, tracking and characterizing at least one line of said spectrogram image, said feature extractor calculating a fundamental frequency for each of said at least one line and rouping said at least one line into harmonically related lines based on said fundamental frequency;
a harmonic set extractor for determining a harmonic content of said at least one line; and
a classifier for comparing said harmonic content against known acoustic signature templates
wherein said feature extractor includes a detector for labeling a pixel with a ON state and a OFF state, wherein said pixel is located with said ON state if a grey-level value of said pixel is above a first threshold and a KY value of said pixel is above a second threshold; and
wherein said pixel has an upper set of line segments and a lower set of line segments extending radial from said pixel, said detector further including:
a first summer for summing grey-level values of all pixels along each of said upper set of line segments and said lower set of line segments, said first summer determining a upper line segment maximum value and a lower line segment maximum value; and
a second summer for summing said upper line segment maximum value and said lower line segment maximum value to determine said KY value.

10. The apparatus according to claim 7, wherein said feature extractor includes a blob-coloring processor for forming into tracked signals all pixels having a ON state by taking all spatially connected pixels and grouping them into a single signal object.

11. The apparatus according to claim 7, wherein said feature extractor further includes a signal extender for extending a signal in a given direction by labeling pixels having a OFF state with a ON state label when said pixels have a KY value greater than a threshold.

12. The apparatus according to claim 7, wherein said classifier computes a classification score for each group of lines output by said harmonic set extractor by comparing said each group of lines against at least one acoustic signature template.

13. A method for recognizing and identifying acoustic signals from a sensor, comprising:
generating a spectrogram image of the acoustic signals;
detecting, tracking and characterizing at least one line of said spectrogram image by comparing grey-level values against a first threshold and KY values against a second threshold;
calculating a fundamental frequency for each of said at least one line;
grouping said at least one line into harmonically related lines based on said fundamental frequency;
determining a harmonic content of said at least one line; and
classifying said harmonic content against known acoustic signature templates by calculating a weighted score using said fundamental frequency.

14. The method according to claim 13, wherein said step of detecting includes the step of labeling a pixel with a first state and a second state, said first state and said second state being mutually exclusive, wherein said pixel is labeled with said first state if a grey-level value of said pixel is above a first threshold and a KY value of said pixel is above a second threshold.

15. A method for recognizing and identifying acoustic signals from a sensor, comprising:
generating a spectrogram image of the acoustic signals;
detecting, tracking and characterizing at least one line of said spectrogram image by comparing grey-level values against a first threshold and KY values against a second threshold;
calculating a fundamental frequency for each of said at least one line;
grouping said at least one line into harmonically related lines based on said fundamental frequency;
determining a harmonic content of said at least one line; and
classifying said harmonic content against known acoustic signature templates
wherein a pixel has an upper set of line segments and a lower set of line segments extending radial from said pixel, said step of detecting further including the step of:
summing grey-level values of all pixels along each of said upper set of segments and said lower set of line segments;
determining a upper line segment maximum value and a lower line segment maximum value; and
summing said upper line segment maximum value and said lower line segment maximum value to determined said KY value.

16. The method according to claim 13, wherein said step of detecting includes the step of forming into tracked signals all pixels having a ON state by taking all spatially connected pixels and grouping them into a single signal object.

17. The method according to claim 13, wherein said step of detecting includes the step of extending a signal in a given direction by labeling pixels with a OFF state with a ON state label when said pixels have a KY value greater than a third threshold.

18. The method according to claim 13, wherein said step of classifying includes the step of computing a classification score for each group of lines output by a harmonic set extractor by comparing said each group of lines against at least one acoustic signature template.

19. A method for recognizing and identifying acoustic signals from a sensor, comprising:
generating a spectrogram image of the acoustic signals;
detecting, tracking and characterizing at least one line of said spectrogram image by comparing grey-level values against a first threshold and KY values against a second threshold;
determining a harmonic content of said at least one line;
classifying said harmonic content against known acoustic signature templates;
summing grey-level values of all pixels along an upper set of line segments and a lower set of line segments;
determining an upper line segment maximum value and a lower line segment maximum value; and
summing said upper line segment maximum value and said lower line segment maximum value to determine a KY value.

* * * * *